Nov. 20, 1956  G. LARSSON  2,771,266
PIVOTED GATE VALVE
Filed July 10, 1952  2 Sheets-Sheet 1

Inventor:
Gustaf Larsson
by his Attorneys
Howson & Howson

Nov. 20, 1956  G. LARSSON  2,771,266
PIVOTED GATE VALVE
Filed July 10, 1952  2 Sheets-Sheet 2
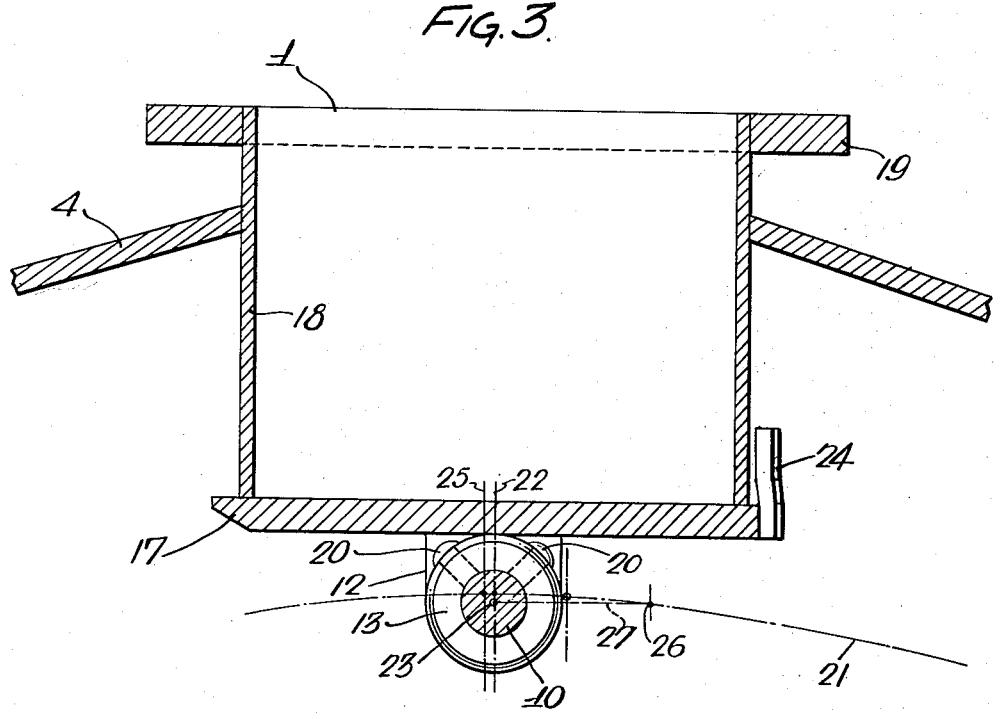
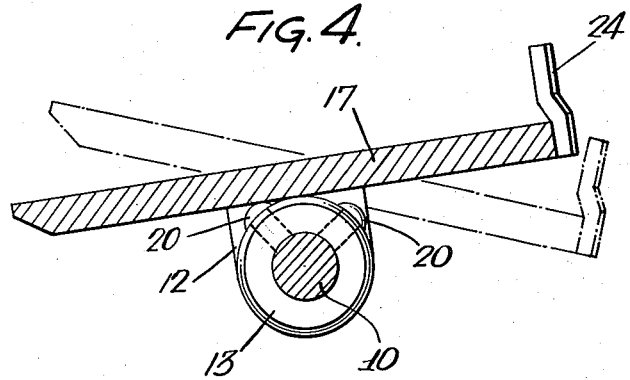
Inventor:
Gustaf Larsson
by his Attorneys
Howson & Howson United States Patent Office 2,771,266
Patented Nov. 20, 1956

2,771,266

PIVOTED GATE VALVE

Gustaf Larsson, Jonkoping, Sweden, assignor to AB Svenska Flaktfabriken, Stockholm, Sweden Application July 10, 1952, Serial No. 298,152

Claims priority, application Sweden July 12, 1951

4 Claims. (Cl. 251—87)

The present invention relates to a discharging throttle intended for the bottom opening of a shaft, consisting of a plain sliding disk and a supporting arm extended to a rod and guiding the disk, which supporting arm is supported beside the shaft and mainly characterized by that the bearing of the supporting arm is so arranged that the axis of the bearing forms an obtuse angle with the plane of the opening of the shaft and that the leading edge of the disk has a greater width than this opening and is conveniently provided with a beveled straight line leading edge.

Especially when discharging adhesive dust it has been difficult to use conventional gate valves. The valve of the present invention assures that a good closure between the bottom opening of the shaft and the sliding disk is always attained. In discharging throttles arranged for discharging dust from cyclones and similar purifying apparatus it is an important disadvantage if a substantial amount of air is let into the cyclone or the purifier during the movements of the discharging throttle. This is substantially prevented in this new throttle by the cutting action of the leading edge of the disk as it is slid across the opening of the shaft.

The invention will now be more fully described in connection with the accompanying drawing, in which:

Fig. 3 is a transverse sectional view taken on the line 3—3 of Fig. 2; and,

Fig. 4 is a detached sectional view of the disk for closing the opening of the shaft.

Figure 1:
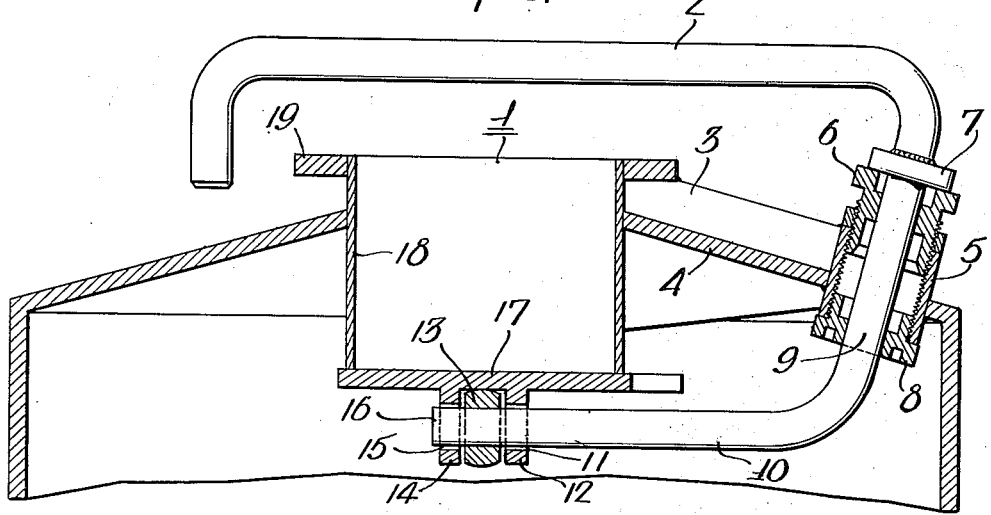
Fig. 1 is a section of the discharging throttle.

In the drawing a shaft is designated 1 provided with side walls 18 and flanges 19 in order to connect the shaft to a cyclone or a similar dust separating device. A container shown in part is designated 4 to which a flange 3 is fastened as a support for a bearing 5, 6, 7 and 8. The friction between a supporting arm 2, 9, 10 inserted in the bearing and the bearing surfaces can be reduced by conventional bearing means. A sliding disk is designated 17 and provided with two lugs 12, 14 in its centre. Between these lugs a ring 13 is arranged which is fastened to the end 16 of the supporting arm. The ring is provided with spherical rounded edges as mentioned above and a certain clearance is provided for the supporting arm in the lugs 12, 14. In order to be sure that the sliding disk is passing close to the plane of the opening of the shaft when the disk is guided from an opened throttle position to a closed position two plugs or rivets 20 may be arranged at the ring 13 at a mutual angular distance, for instance 45°. These plugs limit the movements of the inclination of the disk with suitable clearances in each direction.

Figure 2:
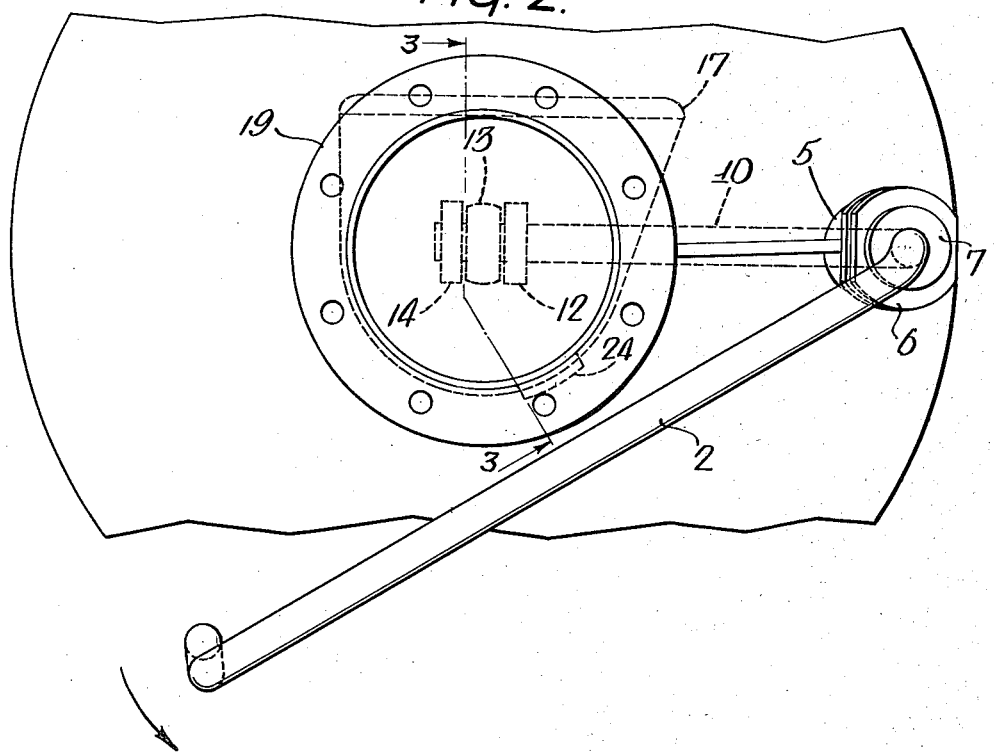
Fig. 2 is a top plan view of the shaft, the disk, the supporting arm (the rod) and the bearing of the supporting arm.

It is noted that the lugs 12 and 14 have central apertures 15 which are slightly greater than the diameter of the supporting arm 10 so as to provide a limited clearance therebetween. In this manner, it is possible to obtain a very good closing between the sliding disc 17 and the bottom of the shaft 18. As shown in Fig. 1, the mounting of the arm 10 is such that it normally describes an arcuate or curved path indicated at 21 in Fig. 3. The high point of the path indicated at 22 is situated below the center of the shaft 18. With reference to Figs. 2 and 3, it is shown that when the disc 17 is slid into registry with the shaft 18, it passes beyond the point 22 to a position 25. A stop head 24 is provided on the disc 17 to limit the movement of the disc to the position indicated at 25. Thus, when the supporting arm is in its limit position shown in Fig. 2, the shaft is beyond the high point of the path 21 so that when vibrations occur, the disc 17 has a tendency to move further beyond the center, i. e., toward the closed position, and there is little likelihood of the disc being displaced to the open position as a result of the vibration in the cyclone. It should be noted that the arm 10 is elongated so that it is free to flex downwardly slightly upon the impressing of pressure on its outer end. With reference to Fig. 3, it is shown that the path 21 would bring the arm 10 to a point above its position shown in Fig. 3, which is limited by the engagement of the disc 17 against the bottom of the shaft 18. In operation, when the disc is brought into engagement with the shaft, the point of contact would correspond to the point 26 in the path 21. As the disc slides to closed position, the arm 10 is unable to continue in the path 21, but follows the horizontal path indicated by the broken lines at 27 to the position 23 and beyond to the position on the line 25. In this respect, it should be noted that Fig. 2 shows the disc in its closed limit position, whereas Fig. 3 shows the disc slightly displaced from its limit position.

I claim:

1. For a planar valve seating surface defining an opening, a closure valve comprising a plane disk having spaced apertured lugs depending from the center thereof, a rod having one resilient portion disposed substantially parallel to the plane of the seating surface and loosely mounted in the apertures of said lugs, a ring fixed to the rod portion intermediate the lugs to prevent displacement of the disk axially from the rod, said rod having another portion remote from the disk disposed at a given obtuse angle to said one resilient rod portion, and bearing means mounting said other portion of the rod against substantial axial displacement and for pivotal movement about an axis coplanar with the perpendicular center line of said opening and disposed at said given obtuse angle to the plane of said seating surface to effect sliding movement of said disk across said seating surface, said one resilient rod portion being operable to move in an arcuate path having a high point underlying said seating surface, the resilience in said one rod portion thereby providing an upward bias on said disk to sealingly engage the same against said seating surface.

2. A closure valve according to claim 1 wherein said ring is provided with an outer spherical rounded edge engaging the disk, and wherein further the resilient rod portion is of lesser diameter than the apertures in said lugs to provide limited angular movement of said disk relative to said rod.

3. For a planar valve seating surface defining an opening, a closure valve comprising a plane disk, a rod having one resilient portion disposed substantially parallel to the plane of said seating surface and adapted to mount said disk, said rod having another portion remote from the disk disposed at a given obtuse angle to said one resilient portion, bearing means mounting said other portion against substantial axial displacement and for pivotal movement about an axis coplanar with the perpendicular center line of said opening and disposed at the given obtuse angle to the plane of said seating surface to effect sliding movement of said disk across the valve seating surface, said one resilient rod portion being operable to move in an arcuate path having a high point in alignment with the center line of said opening, the resilience in said one rod portion thereby providing an upward bias on said disk to sealingly engage the same against said seating surface, and stop means on said disk to limit the pivotal movement of said arm to a predetermined distance past said high point, whereby said upward bias effects an over-center engagement of said disk with said seating surface.

4. A closure valve according to claim 3 wherein the leading edge of said disk is beveled and is of greater width than the valve seating surface.

References Cited in the file of this patent

UNITED STATES PATENTS

| 689,231 | Rolston | Dec. 17, 1901 |
| 863,004 | Smith | Aug. 13, 1907 |
| 2,141,692 | Lofton | Dec. 27, 1938 |

FOREIGN PATENTS

| 245,863 | Great Britain | of 1926 |